No. 796,961. PATENTED AUG. 8, 1905.
E. H. DUNN.
EGG CANDLING SCOOP.
APPLICATION FILED NOV. 4, 1904.
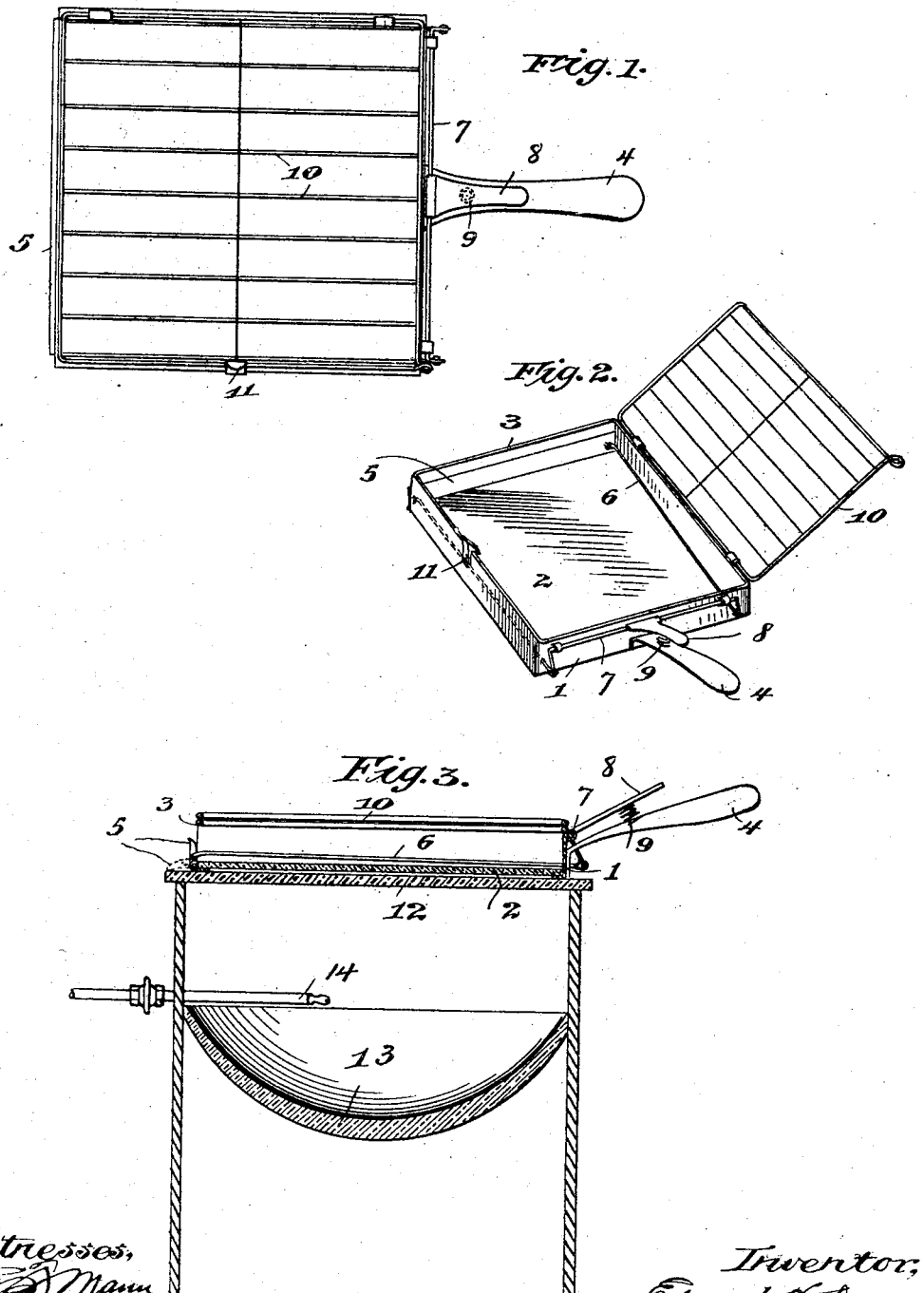
Witnesses:
Inventor,
Edward H. Dunn,
By Offield, Towle & Linthicum
Attys

UNITED STATES PATENT OFFICE.

EDWARD H. DUNN, OF MARCUS, IOWA.

EGG-CANDLING SCOOP.

No. 796,961.          Specification of Letters Patent.          Patented Aug. 8, 1905.

Original application filed March 12, 1904, Serial No. 197,818. Divided and this application filed November 4, 1904. Serial No. 231,383.

*To all whom it may concern:*

Be it known that I, EDWARD H. DUNN, a citizen of the United States, residing at Marcus, in the county of Cherokee and State of Iowa, have invented certain new and useful Improvements in Egg-Candling Scoops, of which the following is a specification.

This invention relates to egg-candling scoops, and more particularly to a scoop adapted for use in candling eggs, and has among its salient objects to provide a combined scoop and tray having a light-transmitting bottom and with which a layer of eggs can be conveniently scooped up in one operation and exposed to the light, to provide a device of the character referred to with a light-transmitting cover for retaining the eggs in said scoop, and in general to provide a scoop which is simple in construction and operation and convenient and rapid in handling eggs.

The invention will be readily understood from the accompanying drawings, in which—

Figure 1 is a plan view of the invention. Fig. 2 is a perspective view of the same with the retaining grate or cover in the open position, and Fig. 3 is a vertical sectional view through the scoop and a light-furnishing stand with which it can be used.

Referring to the drawings, 1 designates the body of the scoop, preferably of rectangular form and having a glass bottom 2. In the present construction the body is of metal and is provided around its upper edge with a stiffening-wire 3. It is also provided with a handle 4 of any suitable and convenient form, and the end of the body opposite that upon which the handle is placed is left open except for the stiffening-wire 3.

5 designates a hinged strip or scooping-lip mounted upon the open end of the tray and is adapted to be moved into either the vertical position, as shown in the drawings, or moved into the horizontal position in order to be slipped under the eggs in scooping them up. Said scooping-lip is operated by means of rods 6, connected at one end with said lip and at their other ends connected with a cross-rod 7, mounted upon the end of the tray-body and provided adjacent the handle 4 with a rocking lever 8, said lever being normally held in the raised position by means of a spring 9. It will thus be seen that by pressing downwardly with the thumb or finger upon said rocking lever 8 the rods 6 are moved longitudinally toward the open end of the body, thus moving the hinged scooping-lip down into a horizontal position or in the same plane with the bottom 2. The scoop is then pushed under a layer of eggs and the rocking lever released, which permits the lip to rise to the vertical position, thus confining the eggs against rolling out of the tray.

10 designates a grate-like cover hinged upon the side of the tray body and held in the closed position by means of a latch mechanism 11.

The combination scoop and tray is particularly convenient when used in connection with an open-ended egg-case, such as is described in my pending application, Serial No. 197,818 and filed March 12, 1904, for egg-candling apparatus, and of which this is a divisional application. The eggs are exposed in layers in edge view; the scoop is passed under one layer and closed, and the whole placed upon a light-furnishing stand, which may be of any desirable type. In Fig. 3 I have shown a casing having a glass or light-transmitting top 12, a reflector 13, and a gas-jet 14. The tray containing the eggs is placed upon the casing in the manner shown in Fig. 3 and the gas lighted, whereupon the eggs are exposed for examination.

While I have shown but one form of the invention, it is obvious that alterations and modifications can be made therein without departing from the spirit of the invention, and I do not, therefore, limit the invention to the form shown, except in so far as the details of construction and arrangement are made the subject-matter of specific claims.

I claim—

1. An egg-candling device, comprising a tray-like member having a light-transmitting bottom and open at one side, whereby said bottom may be passed under a layer of eggs, and means carried by said tray-like member for retaining said eggs within said tray during the candling process.

2. An egg-candling device, comprising a tray-like member having a light-transmitting bottom and open at one side, a scoop-lip hinged thereto at the open side and adapted to be passed under a layer of eggs, and means for raising said lip to an upright position whereby it constitutes a closure for the open side of said tray.

3. An egg-candling scoop consisting of a light-transmitting bottom member adapted to be passed under a layer of eggs and provided on three sides with retaining-walls, and a grate-like retaining member hinged thereupon and adapted to close upon the same for the purpose described.

4. A combined scoop and tray for taking up eggs layer by layer, comprising a box-like body having a light-transmitting bottom and an open end, a scoop-lip hinged upon said open end and constituting a closure therefor when in upright position, and a handle upon said box-like body provided with means for operating said scoop-lip, substantially as described.

5. A combined scoop and tray for handling eggs, comprising a box-like body having a light-transmitting bottom and an open end, a scoop-lip hinged upon said open end, a handle upon said body, a rocking lever mounted adjacent said handle and having operative connections with said scoop-lip whereby the latter can be moved into the down or up position, substantially as described.

6. An egg-candling apparatus, comprising a box-like scoop-body having a light-transmitting bottom and an open end for passing under the eggs, a grate-like retaining-cover hinged thereupon and a handle by means of which said body is thrust under the eggs and the eggs lifted to the candling-light, substantially as described.

7. An egg-candling apparatus, comprising a substantially rectangular metal frame provided in its upper edge with a strengthening-wire and having one end open, a glass bottom therefor, a scooping-lip hinged thereupon at the open end thereof, a handle with means connected with said lip for raising and lowering it to the up and down position, and a grate-like retaining-cover therefor, substantially as described.

EDWARD H. DUNN.

Witnesses:
W. L. GUND,
LOUIS GUND.